United States Patent [19]

Kunicki et al.

[11] Patent Number: 4,522,648

[45] Date of Patent: Jun. 11, 1985

[54] PROCESS FOR DESULFURIZATION OF GASES WITH MOLTEN MINERAL BATHS DURING GASIFICATION OF CARBON PRODUCTS

[76] Inventors: Maryan Kunicki, 26, rue Paul Eluard, Corbeil-Essonnes; Michel Roussel, 97, avenue Victor Hugo, Paris, both of France

[21] Appl. No.: 610,251

[22] Filed: May 14, 1984

[30] Foreign Application Priority Data

May 20, 1983 [FR] France ................ 83 08361

[51] Int. Cl.$^3$ ............................................. C21C 7/02
[52] U.S. Cl. .................................. 75/24; 75/53; 75/58
[58] Field of Search ............................ 75/24, 58, 53

[56] References Cited

U.S. PATENT DOCUMENTS

| | | | |
|---|---|---|---|
| 3,932,170 | 1/1976 | Shah | 75/58 |
| 4,168,966 | 9/1979 | Furui | 75/257 |
| 4,326,887 | 4/1982 | McAllister | 75/257 |

Primary Examiner—Peter D. Rosenberg
Attorney, Agent, or Firm—Browdy and Neimark

[57] ABSTRACT

A process for desulfurization of gases with molten mineral baths during gasification of carbon products comprises the replacement of limestone or calcomagnesium materials by metallurgical slags, such as blast-furnace or steel-furnace slags, having a high basicity index. By means of this replacement, substantial savings in material and energy are achieved. Moreover, the use of residual slags for production of mineral materials that can be granulated and pelletized having good hydraulic properties, and pig iron that can be reused in metallurgical circuits, is assured.

6 Claims, No Drawings

PROCESS FOR DESULFURIZATION OF GASES WITH MOLTEN MINERAL BATHS DURING GASIFICATION OF CARBON PRODUCTS

BACKGROUND OF THE INVENTION

This invention relates to the field of gasification of carbon products of various origins such as coals, lignites, peats, etc., and relates more particularly to a new means making it possible to assure desulfurization of the resulting gases with molten mineral baths, while achieving a substantial saving of materials and energy and allowing the production of mineral compositions having good hydraulic characteristics and pig irons that can be used in metallurgical circuits.

For some years studies have been made of processes for gasification of carbon products, such as coals, that are more or less rich in aches and sulfur. In these processes, problems arise in eliminating the ashes and especially trapping the sulfur to obtain gases rid of this polluting element.

According to several techniques, the ashes from the coal are obtained in the liquid state and are treated like any molten mineral material, e.g., by casting in pits with slow cooling, by hydraulic granulation, by pelletizing, etc.

Efforts to assure as complete a trapping as possible of the sulfur and sulfur compounds that form during coal gasification have led to modifying the chemical composition of the molten ashes to give them a desulfurizing power they do not normally possess due to their essentially being made up of silica, and alumina, acid elements. The additions essentially have a base of materials containing CaO and MgO, such as limestone flux, dolomite, limes and magnesium lime.

By adjusting these addition products as a function of the chemical composition of the ashes, it is possible to obtain molten mineral materials having the same physical and chemical properties as metallurgical slags and particularly having the power to retain sulfur in the form of sulfides such as CaS, FeS and MnS soluble in the molten silicates.

Since coal gasification is normally performed in a reducing medium to obtain a gas mixture rich in CO, the iron oxides going into the composition of the ashes are reduced to the metallic state and yield a pig iron that accumulates in the lower part of the reactor.

Three types of products are obtained in a gasification process of this type: a gas mixture free of sulfur compounds, a slag made up of calcium silicates and silicoaluminates if the addition has only a lime base and a pig iron coming from the iron contained in the coal ashes.

Addition of the product contributing lime especially is expensive in material used and energy consumed since quarried limestone materials have to be introduced which must ge decarbonated either outside or inside the gasification reactor.

It has now been found that it is possible to use, as the basic addition product, instead of limestone or calcomagnesium materials, metallurgical slags having chemical compositions favorable to trapping sulfur, i.e., having the capacity to dissolve the above mentioned sulfur compounds.

It is known that metallurgical slags, such as blast-furnace, converter, or electric-furnace slags, have chemical compositions that enable them to fix the sulfur present in the solid or liquid charges containing iron which are to be treated in the various steelmaking apparatus. These slags are characterized by a desulfurizing power that depends on the basic elements going into their composition and which are classified as follows in descending order: $K_2O$, $Na_2O$, $CaO$, $MgO$, $BaO$, $FeO$, $MnO$. The elements are found in variable proportions depending on the nature of the metallurgical slags considered.

Blast-furnace slag comprises mainly CaO, MgO and a slight percent of alkalines.

Converter and electric furnace slags essentially contain CaO, FeO, MnO and MgO. These slags have much higher basicity indices than blast furnace slags and have the feature of also having more iron and manganese content.

In some cases, steel furnace slags are not entirely recycled in the metallurgical line and are put to less upgrading uses for iron and manganese principally (soil improvement, road aggregate, fill, etc.).

DESCRIPTION OF THE INVENTION

According to the process of the invention, metallurgical slags having a high basicity index corresponding to a $CaO/SiO_2$ ratio at least equal to 1.3 are therefore used as an addition to the residual ashes from gasification of carbon products.

Basic blast-furnace slags can be used without any problem because their sulfur saturation is generally incomplete; generally they contain only 1% sulfur, but can absorb 2% or more sulfur.

Slags produced in steel manufacturing processes, using either converters or electric furnaces, exhibit still more favorable chemical conditions, due to the excess of basic elements in relation to the acid elements: actually, it is common to have $CaO/SiO_2$ ratios on the order of 3 to 4 and $FeO+MnO$ contents close to 30%.

There are great advantages to introducing in the gasification reactor steel-furnace slags either in molten form (which facilitates the preservation of melting energy), or in solid form (which facilitates conservation of energy in decarbonating the $CaCO_3$ and $MgCO_3$).

With the gasification reactor running under reducing conditions, the iron oxides contained in the slags, as well as the manganese oxides, are reduced to metallic state in the form of pig iron which is added to the pig coming from the iron oxides of the ashes.

The quality of the pig iron depends, in this case, not only on the chemical composition of the ashes, but also on the slags introduced, particularly from the viewpoint of phosphorus content. In general, the resulting pig iron can be considered as phosphorous and can be reintroduced into steelmaking apparatus that are fed phosphorous pig iron (OLP, LD-AC, LWS processes).

EXAMPLE OF EMBODIMENT

Take an installation for gasification on a molten mineral bath fed coal whose ashes have the following chemical composition (origin Sarre Lorraine)

| $SiO_2$ | 48.8% | $K_2O$ | 4.5% |
|---|---|---|---|
| $Al_2O_3$ | 29.3% | $Na_2O$ | 0.6% |
| $Fe_2O_3$ | 11.4% | $SO_3$ | 0.5% |
| CaO | 1.8% | | |
| MgO | 2.4% | | |

Or a common slag from an LD steel-furnace having the following chemical composition:

| | |
|---|---|
| CaO | 45% |
| SiO$_2$ | 12% |
| Al$_2$O$_3$ | 1% |
| MgO | 2% |
| Fe$_2$O$_3$ | 33% |
| MnO | 4% |
| P$_2$O$_5$ | 2.5% |

An attempt is made to obtain a molten mineral material whose CaO/SiO$_2$ ratio is about 1.5 to have a good desulfurizing power.

Calculations show that in this specific case, the following ratio by mass exists:

$$\frac{\text{steel} - \text{furnace slag}}{\text{ashes}} = 2.64$$

Consequently, for 100 kg of silicoaluminous ashes it is necessary to add 264 kg of LD steel furnace slag.

The masses of the elements contributed by 364 kg of ashes+LD steel-furnace slag are the following:

| | | | | |
|---|---|---|---|---|
| CaO | 120.5 kg | | Fe$_2$O$_3$ | 98.52 kg |
| SiO$_2$ | 80.5 kg | or | Fe° | 69 kg |
| Al$_2$O$_3$ | 31.94 kg | | MnO | 10.56 kg |
| MgO | 7.68 kg | or | Mn° | 8.2 kg |
| | | | P | 2.9 kg |

Starting with 100 kg of ashes and 264 kg of steel-furnace slag, it is possible to obtain 241 kg of molten mineral material and a pig iron containing: 69 kg of iron, 8.2 kg of manganese and 2.90 kg of phosphorous.

The chemical composition of the molten mineral material broken down into the elements CaO, SiO$_2$, Al$_2$O$_3$, MgO will then be:

| | |
|---|---|
| CaO | 50.1% |
| SiO$_2$ | 33.44% |
| Al$_2$O$_3$ | 13.27% |
| MgO | 3.20% |

This then is a product comparable to a blast-furnace slag of the Lorraine type produced in the 1960s.

If the representative point of the chemical composition is placed in the CaO-SiO$_2$-Al$_2$O$_3$ triangular diagram, it is found that it is located, according to Fritz Keil, in the zone of vitreous granulated slags exhibiting the highest hydraulic properties (see diagram, page 94, FIG. 31 of the work "Hochoffen Schlacke" [Blast Furnace Slags], 2nd edition 1963).

The pig iron resulting from the operation of reduction of metal oxides will have the characteristics of a manganese pig iron since the ratio of manganese to iron (Mn/Fe) is 0.12 and simultaneously of a phosphorous pig iron since the ratio of phosphorous to iron and manganese $$\left(\frac{P}{Fe + Mn}\right)$$

is 0.037.

One very significant advantage is the easier and faster homogenizing of the ash-steel furnace slag mixture at a lower temperature than that of the ash-lime mixture.

Actually, assimilation of this latter by molten ashes occurs at a temperature less than 1700° C. obtained in the reactor heated by an electric arc.

Addition of solid steel-furnace slag which should combine with the ashes of the gasified coal can occur in two different ways:

(1) by intimately mixing steel-furnace slag with the coal to be gasified in proportions making it possible to obtain the molten mineral mixture of the desired composition; or (2) by adding the steel-furnace slag to the mineral bath of the reactor, independently of the feed of the carbon product.

This second way is more flexible since it makes possible a rapid adjustment of the chemical composition of the final molten mixture.

However, the advantage of the first method is having, from the start, a good contact between the metallurgical slag and the ashes resulting from gasification.

The molten mineral material that is produced can be treated like a standard blast-furnace slag but preferably with treatment by pelletizing which makes it possible to obtain a very high-quality dry material that can be used in cement plants, as ternary road mixture, or in construction as stabilized light aggregate.

Besides obtaining slag from desulfurization, in the process of the invention, a large amount of pig iron is produced, depending on the amounts of the chemical compositions of the ashes and metallurgical slag.

The degree of phosphoration of the pig iron depends essentially on the phosphorous content of the metallurgical slag. With an LD steel-furnace having 2.5% P$_2$O$_5$, the content of the pig iron for the example cited will be on the order of 3–4%. If low-content slags are used (coming from refining of phosphorous pig iron as is the case at Lorraine), the phosphorus content of the pig iron obtained during the coal gasification operation will necessarily be greater and could amount to 7 to 10% phosphorus.

What is claimed is:

1. A process for desulfurization of gases with molten baths obtained from ashes coming from the process of gasification of carbon products and addition of basic products, comprising:
    adding to said ashes a metallurgical slag comprising blast-furnace or steel-furnace slag or a mixture thereof, said metallurgical slag having a high basicity index corresponding to a CaO/SiO$_2$ ratio greater than 1.3 for the molten bath.

2. The process of claim 1, wherein the step of adding comprises intimately mixing metallurgical the carbon product to be gasified.

3. The process of claim 1, wherein the metallurgical slag is added to the ashes of the gasification reactor, independently of the carbon product feed.

4. The process of claim 1, wherein the amount of metallurgical slag added to the molten ashes is determined as a function of the particular compositions of said ashes and metallurgical slag, to produce after gasification a molten mineral material exhibiting, after quenching, optimal hydraulic properties as well as a manganese phosphorous slag that can be reused in metallurgical circuits.

5. The process of claim 2, wherein the amount of metallurgical slag added to the molten ashes is determined as a function of the particular compositions of said ashes and metallurgical slag, to produce after gasification a molten mineral material exhibiting, after quenching, optimal hydraulic properties as well as a manganese phosphorous slag that can be reused in metallurgical circuits.

6. The process of claim 3, wherein the amount of metallurgical slag added to the molten ashes is determined as a function of the particular compositions of said ashes and metallurgical slag, to produce after gasification a molten mineral material exhibiting, after quenching, optimal hydraulic properties as well as a manganese phosphorous slag that can be reused in metallurgical circuits.

* * * * *